(12) United States Patent
Zelisko et al.

(10) Patent No.: US 9,403,993 B2
(45) Date of Patent: Aug. 2, 2016

(54) SILANE CONTAINING COATINGS

(71) Applicant: Vanchem Performance Chemicals, Burlington (CA)

(72) Inventors: Paul M Zelisko, Stoney Creek (CA); Jacqueline P Séguin, Ajax (CA)

(73) Assignee: VANCHEM PERFORMANCE CHEMICALS, Burlington, Ontario (CA)

( * ) Notice: Subject to any disclaimer, the term of this patent is extended or adjusted under 35 U.S.C. 154(b) by 497 days.

(21) Appl. No.: 13/815,715

(22) Filed: Mar. 15, 2013

(65) Prior Publication Data

US 2014/0272159 A1 Sep. 18, 2014

(51) Int. Cl.
| | |
|---|---|
| *C09D 5/08* | (2006.01) |
| *C23F 11/00* | (2006.01) |
| *B05D 7/00* | (2006.01) |
| *C23C 22/83* | (2006.01) |
| *C23F 11/10* | (2006.01) |

(52) U.S. Cl.
CPC .. *C09D 5/08* (2013.01); *B05D 7/50* (2013.01); *C23C 22/83* (2013.01); *C23F 11/10* (2013.01); *B05D 2202/10* (2013.01); *C23C 2222/20* (2013.01)

(58) Field of Classification Search
None
See application file for complete search history.

(56) References Cited

U.S. PATENT DOCUMENTS

| 5,344,674 | A | * | 9/1994 | Wu | 427/386 |
| 2006/0204767 | A1 | * | 9/2006 | Albert et al. | 428/447 |
| 2007/0054056 | A1 | * | 3/2007 | Albert | C09D 4/00 |
| | | | | | 427/387 |
| 2009/0318612 | A1 | * | 12/2009 | Plehiers et al. | 524/588 |
| 2010/0007025 | A1 | * | 1/2010 | Nakagawa et al. | 257/759 |
| 2010/0015339 | A1 | * | 1/2010 | Morillo et al. | 427/327 |

* cited by examiner

*Primary Examiner* — Shamim Ahmed
*Assistant Examiner* — Bradford Gates
(74) *Attorney, Agent, or Firm* — Aird & McBurney LP

(57) ABSTRACT

Disclosed are corrosion resistant compositions and processes for the preparation thereof that involve the application of a plurality of layers comprised of at least one tetraalkoxysilane and at least one functionalized silane layer to a supporting substrate.

29 Claims, No Drawings

SILANE CONTAINING COATINGS

This disclosure is generally directed to novel silane containing compositions and more specifically to compositions comprised of tetraalkoxy silanes and functionalized silanes, such as aminoalkylaminoalkylalkoxysilanes aminoalkylaminoalkyltrialkoxysilanes, aminoalkylalkoxysilanes, aminoalkyltrialkoxysilanes, and corrosion coating processes thereof.

BACKGROUND

Corrosion of various substances continues to be a costly and complicated matter and where there has been consumed substantial research efforts, especially as these efforts relate to the development of environmentally acceptable corrosion inhibitors. Known are a number of corrosion inhibitors used to reduce the corrosion of for example, metal and metal alloy surfaces. Difficulties encountered with some common known corrosion inhibitors is there in-affectedness over extend time periods and where an unacceptable high percentage or rate of corrosion results. Also, a number of known corrosion inhibitors may not effectively function over broad temperature ranges and possess unsatisfactory performance under acidic conditions. Moreover, a number of common corrosion inhibitors are not sufficiently resistant to corrosion from salts and also possess health, safety and environmental considerations, that tend to constrain or prevent the commercial use of such inhibitors.

The corrosion of metal surfaces usually occurs when the metal surfaces are contacted by a corrosive environment containing for example, an oxidizer such as an electrochemical oxidizer, or a chemical oxidizer. Illustrative corrosive environments include, for example, acidic and salt environments, environments containing water vapor in the presence of air and/or oxygen, and environments containing chloride or bromide ions, carbon dioxide and/or hydrogen sulfide.

Examples of known corrosion inhibitors include nitrogen-containing compounds, such as fatty amines, alkoxylated fatty amines, amidoamines, and quaternary ammonium compounds, In attempts to inhibit the corrosion of metal surfaces, particularly those exposed to the elements, coatings are often applied to these surfaces, irrespective of whether the metal is to be subsequently painted. However, these coatings are often comprised of iron phosphates, zinc phosphates, and chromium compounds and where the phosphate salts are deleterious to the environment, and in particular to aquatic systems, while chromium compounds are known to be toxic. The environmental issues relating to the use of toxic chemicals has been well documented, especially as these chemicals adversely affect human beings, animals, trees, plants, fish, and other resources. Also, it is known that toxic chemicals usually cannot be safely recycled, are costly to prepare, cause the pollution of the world's water, and add to the carbon footprint.

As used herein, the term "inhibit" and its derivatives such as "inhibitors" refer to a lessening of the tendency of a phenomenon to occur and/or the degree to which that phenomenon occurs. The term "inhibit" does not imply any particular degree or amount of inhibition. The term "corrosion" refers for example, to any reaction between a material and its environment that causes some deterioration of the material or its properties. Examples of common types of corrosion include, but are not limited to, the rusting of a metal, the dissolution of a metal in acids, and patina (a thin layer formed by corrosion on the surface of some metals and minerals, especially the green layer that covers copper and bronze) development on the surface of a metal.

Therefore there is a need for corrosion resistant compositions and processes thereof that minimize, or substantially eliminate the disadvantages illustrated herein.

Also, there is a need for compositions that inhibit the corrosion of a number of various components, such as steel.

Further there is a need for economical processes for the preparation of corrosion resistant or corrosion free compositions and the use of these compositions as metal or metal containing coatings.

Another need relates to environmentally acceptable corrosion inhibitor compositions.

Moreover there is a need for corrosion inhibitor compositions that minimize the degradation of substances, such as steel panels that are subsequently painted.

Yet another need resides in compositions and processes that avoid or minimize the use of toxic materials.

There is also a need for corrosion inhibitor or corrosion free compositions that resist or prevent corrosion for extended time periods as illustrated herein.

These and other needs and advantages are achievable in embodiments with the processes and compositions disclosed herein.

SUMMARY

Disclosed is a process comprising the application of at least one tetraalkoxysilane first layer and at least one functionalized silane second layer to a supporting substrate.

Also disclosed is a process comprising applying to a supporting substrate layer a first layer solution of a tetraalkoxysilane first and a second layer solution thereover of a functionalized silane of an aminoalkylaminoalkyltrialkoxysilane, an aminoalkyltrialkoxysilane, or a vinylsilane resulting in corrosion resistant characteristics subsequent to drying.

Moreover, disclosed herein are corrosion resistant compositions comprised of a tetraalkoxysilane and a functionalized silane selected from the group consisting of an aminoalkylaminoalkyltrialkoxysilane, an aminoalkyltrialkoxysilane, an allylsilane and a vinylsilane and corrosion free compositions comprised of a tetraalkoxysilane and a functionalized silane selected from the group consisting of an aminoalkylaminoalkyltrialkoxysilane, an aminoalkylaminoalkylalkoxysilane, an aminoalkylalkoxysilane and a vinylsilane.

Further, disclosed is a process comprising the application or exposure of at least one tetraalkoxysilane layer and at least one functionalized silane layer to a supporting substrate.

In embodiments the disclosed process comprises applying to a supporting metal or metal containing substrate layer a first layer solution of a tetraalkoxysilane and a second layer solution thereover of a functionalized silane of an aminoalkylaminoalkyltrialkoxysilane, an aminoalkylalkoxysilane, an aminoalkyltrialkoxysilane, or a vinylsilane, resulting in corrosion free characteristics for the substrate subsequent to drying.

Disclosed embodiments include a process which comprises applying to surfaces a solution of at least one tetraalkoxysilane first layer and a solution of at least one functionalized silane second layer and wherein the resulting surfaces are corrosion free for extended time periods and wherein the functionalized silane layer applied to the tetraalkoxysilane layer.

EMBODIMENTS

There is disclosed herein compositions comprised of at least one of an aminoalkylaminoalkyl tetraalkoxy silane, an aminoalkyltetraalkoxy silane, and a vinyl silane, such as a triacetoxy vinyl silane and at least one of a tetraalkoxy silane and which compositions function as corrosions inhibitors for extended time periods. Further, there is disclosed processes that comprise the application of at least one first layer of a tetraalkoxysilane on a suitable substrate, such as steel, and thereafter applying to the tetraalkoxysilane layer at least one second layer of an aminoalkylaminoalkyltetraalkoxy silane, an aminoalkyltetraalkoxy silane, a vinyl silane or mixtures thereof, and which applications are usually accomplished from solutions of the first layer and second layer compositions.

Alkyl Substituents

Throughout the present disclosure and with further regard to the silanes illustrated herein, alkyl includes those substituents with from 1 to about 25 carbon atoms, from 1 to about 18 carbon atoms, from 1 to about 12 carbon atoms, from 1 to about 10 carbon atoms, from 1 to about 6 carbon atoms, from 1 to about 3 carbon atoms, or 1, 2, 3, 4, 5, 6, 7, 8, 9, 10 carbon atoms and the like. Specific examples of alkyl include methyl, ethyl, propyl, butyl, pentyl, hexyl, octyl, nonyl, decyl, undecyl, dodecyl, tridecyl, tetradecyl, pentadecyl, octadecyl, nonadecyleicodecyl, pentadecyl, and the like. Generally alkyl substituents or groups can be represented by $C_nH_{2n+2}$ where n represents the number of carbon atoms and hydrogen atoms. Also encompassed by alkyl are isomers thereof, and derivatives thereof.

Alkoxy Substituents

Generally alkoxy substituents include the alkyl groups illustrated herein with oxygen atoms, that is where an alkyl radical is attached to the remainder of the molecule by oxygen. Thus, throughout the present disclosure and with further regard to the silanes illustrated herein, alkoxy includes those substituents with from 1 to about 25 carbon atoms, from 1 to about 18 carbon atoms, from 1 to about 12 carbon atoms, from 1 to about 10 carbon atoms, from 2 to about 6 carbon atoms, from 1 to about 6 carbon atoms, from 1 to about 3 carbon atoms, or 1, 2, 3, 4, 5, 6, 7, 8, 9, 10 carbon atoms and the like. Specific examples of alkoxy include methoxy, ethoxy, propoxy, butoxy, pentoxy, hexoxy, octoxy, nonoxy, decoxy, undecoxy, dodecoxy, tridecoxy, tetradecoxy, pentadecoxy, hexyldecoxy, octadecoxy, nonadecyleicodecoxy, pentadecoxy, and the like. Also encompassed by alkoxy are isomers thereof, and derivatives thereof.

Tetraalkoxysilanes

The disclosed compositions contain at least one tetraalkoxysilane, with the alkoxy substituents being as illustrated herein. Therefore, the alkoxy substituents for the tetraaalkoxysilanes are the same as the alkoxy groups illustrated herein such as those alkoxy substituents with from 1 to about 25 carbon atoms, from 1 to about 18 carbon atoms, from 1 to about 12 carbon atoms, from 1 to about 10 carbon atoms, from 2 to about 6 carbon atoms, from 1 to about 6 carbon atoms, from 1 to about 3 carbon atoms, or 1, 2, 3, 4, 5, 6, 7, 8, 9, 10 carbon atoms and the like. Specific examples of tetraaalkoxysilanes are tetramethoxysilanes, tetraethoxysilanes, (TEOS) tetrapropoxysilanes, tetrabutoxysilanes, tetrapentoxysilanes, tetrahexoxysilanes, tetrahepoxysilanes, tetraoctoxysilanes, and similar alkoxysilanes.

Functionalized Silanes

In addition to the tetraalkoxysilanes the disclosed compositions contain at least one of aminoalkylaminoalkyltrialkoxysilanes, aminoalkylalkoxysilanes, aminoalkylaminoalkylalkoxysilanes, aminoalkyltrialkoxysilanes, vinylsilanes, allylsilanes, and mixtures thereof and where the alkyl and alkoxy substituents are as illustrated herein.

Specific examples of functionalized silanes include for example, aminomethylaminoalkylrimethoxysilanes, aminoethylaminoalkylriethoxysilanes, aminopropylaminoalkylripropoxysilanes, aminobutylaminoalkylrimethoxysilanes, aminopentylaminoalkylripentoxysilanes, aminomethylaminoarimethoxysilanes, aminomethylaminoalkylriethoxysilanes, aminomethylaminomethyltrimethoxysilanes, arriinomethylaminopropyltrimethoxysilanes, aminoethylaminopropyltrimethoxysilanes, aminopropylaminopropyltrimethoxysilanes, aminobutylaminopropyltrimethoxy silanes, aminoethylaminobutyl trimethoxysilanes, aminomethylaminoethyltrimethoxysilanes, aminoethylaminoethyltrimethoxysilanes, aminoethylaminopentyltripropoxysilanes, and the like and mixtures thereof.

Examples of aminoalkyltrialkoxy silanes are aminomethyltrimethoxysilanes, aminoethyltrimethoxysilanes, aminopropyltrimethoxysilanes, aminobutyltrimethoxysilanes, aminopentyltrimethoxysilanes, aminoheptyltrimethoxysilanes, aminohexylltrimethoxy silanes, aminoheptyl trimethoxy silanes, aminoctyltrimethoxy silanes, aminononyltrimethoxy silanes, aminodecyltrimethoxy silanes, aminododecyltrimethoxy silanes, aminodecyltrimethoxy silanes, aminoethyltriethoxysilanes, aminopropyltributylysilanes, aminopropyltriheptylxy silanes, mixtures thereof, and the like.

Vinyl silanes examples include trialkoxy and triacetoxy vinyl silanes such as, but not limited to, vinyltrimethoxysilanes, vinyltriethoxysilanes, dimethylvinylethoxysilanes, diethylvinylethoxysilanes, dimethylvinylmethoxysilanes, diethylvinylmethoxysilanes, allyltrimethoxysilanes, allyltriethoxysilanes, acryloxytriethoxysilanes, allyldimethylethoxysilanes, allyldiethylethoxysilanes, allyldimethylmethoxysilanes, allyldiethylmethoxysilanes, allyltrimethoxysilanes, mixtures thereof and the like.

The percentages, based on the solids present, of each silane in the compositions disclosed herein varies and generally is from about 1 to about 99, from 1 to about 50, from 1 to about 25, from 1 to about 10, from 1 to about 5 or from about 0.1 to about 1 weight percent of the tetraalkoxysilanes, and 1 to about 99, from 1 to about 50, from 1 to about 25, from 1 to about 10, from 1 to about 5 or from about 0.1 to about 1 weight percent of the aminoalkylaminoalkyltrialkoxysilanes, from about 1 to about 99, from 1 to about 50, from 1 to about 25, from 1 to about 10, from 1 to about 5 or from about 0.1 to about 1 of the aminoalkyltrialkoxy silanes, and from about 1 to about 99, from 1 to about 50 weight percent, from 1 to about 25, from 1 to about 10, from 1 to about 5 or from 0.1 to about 1 weight percent of the vinyl silanes and wherein the total thereof is about 100 percent.

In embodiments of the present disclosure the disclosed anti-corrosion inhibitor or corrosion free compositions can include a mixture of tetraalkoxysilanes and functionalized silanes, like for example, aminoalkylaminoalkyltrialkoxysilanes, tetraalkoxysilanes and aminoalkyltrialkoxysilanes, tetraalkoxysilanes and vinylsilanes or similar differing combinations thereof.

Processes

The disclosed compositions can be selected as coatings and where the resulting products possess anti-corrosion characteristics or inhibit corrosion or permit corrosion free materials, and substances, such as substrates of metals and metal alloys, for extended experimental time periods of for example from about 400 to about 3,000 hours, from about 500 to about 1,500 hours, from about 700 to about 1,200 hours and from about 800 to about 1,100 hours as determined by ASTM D714-02 (blistering), and ASTM D1654-05 (creepage) standards. These experimental hourly time periods can be converted to years when daily exposure to the coated substrate, like stainless steel is involved, for example about 1,000 experimental hours in a salt-spray chamber is equivalent to approximately five years of daily exposure of the substrate to the environmental elements. Thus, in embodiments the coated substrates are it is believed corrosion free or corrosion resistant for from about 1 year to about seven years, from about two years to about five years and in some instances, depending on the substrate and the number of coatings applied about ten years.

In one process aspect of the present disclosure there is applied to a substrate or where the substrate is exposed, a coating or a plurality of coatings of the illustrated herein tetraalkoxysilanes, aminoalkylaminoalkyltetraalkoxysilanes, aminoalkyltetraalkoxy silanes, vinyl silanes, other similar silanes, or mixtures thereof. The coatings can be applied from solutions thereof generated for example by the mixing and heating when needed, of the illustrated herein compositions with effective components, such as concentrated acids, glycols, water, distilled water, tetrahydrofuran, toluene, N-methyl-2-pyrrolidone, N,N-dimethylformamide, N,N-dimethylacetamide, methyl ethyl ketone, dimethylsulfoxide, methyl isobutyl ketone, formamide, acetone, ethyl acetate, cyclohexanone, acetanilide, mixtures thereof, and the like. Specific solution components are dialkylene glycol monoalkyl ethers, such as diethylene glycol monobutyl ethers obtainable from Sigma-Aldrich of St. Louis Mo. as Dowanol DB, citric acid obtainable from Vanchem Performance Chemicals of Burlington Ontario Canada, nitric acid available from Anachemia Canada Inc. of Montréal, Québec Canada, and distilled water or mixtures thereof.

Yet more specifically there is applied to a substrate a solution coating of at least one of a tetraalkoxysilane and at least one of a functional silane in a number of sequences where the tetraalkoxysilane is initially presented as a first layer on the substrate and the functionalized silane is applied as a second layer on the first layer and where the second layer is in contact with the first layer and the first layer is in contact with the supporting substrate. Additionally, at least one functionalized silane can be applied to a substrate as the first layer and at least one tetraaalkoxy silane can be coated on the first layer.

By plurality of layers and at least one layer means for example, from about 1 to about 10 layers, from about 1 to about 7 layers, from about 1 to about 5 layers, from about 1 to about 2 layers like a first tetraalkoxysilane layer coated thereover with a second layer of the functionalized silanes disclosed herein or a first layer of the functionalized silanes and a second layer a tetraalkoxysilane.

Thicknesses of each layer can be controlled by the components and amounts of each of the components and by the methods by which the coating layers are applied to the substrate and to each other. Generally, the thickness of each silane containing layer of the tetraalkoxysilanes and the functionalized silanes, are from about 0.05 to about 25 microns, from about 0.1 to about 10 microns, from about from about 0.4 to about 5 microns, from about 0.1 to about 2 microns, from about 1 to about 2 microns and other suitable effective thicknesses. Numerous techniques can be selected to determine the thickness of each layer, including for example, an electron microscope, computer software, energy dispersion spectroscopy, ellipsometry, and the like.

Supporting substrate examples include metals, like steel, cold-rolled steel and hot-rolled steel, chromium, aluminum, nickel, lead, zinc, other known suitable metals, mixtures thereof, metal alloys, polymers, plastics, machine part components, and the like. It is also believed that a number of auto parts, spacecraft components, engines, silver utensils, building parts, signs, traffic signals, sporting equipment, and other known metal or metal containing materials, especially these materials that will have a paint substance applied to them can be selected for the disclosed processes. For example, supporting substrate panels of steel can be utilized and which substrates after application of the silane layers of the present disclosure can be painted with differing color paints, like black, red, silver, and which panels are resistant to corrosion for extended time periods. The supporting substrate thickness is dependent for example, on the composition of the substrate, and the end use of the material being coated. Generally, the thickness of the supporting substrate is for example, from about 1 to about 100 microns, from about 1 to about 75 microns, from about 1 to about 45 microns, from about 5 to about 25 microns and other suitable effective thicknesses. Numerous know techniques can be selected to determine the thickness of the supporting substrate, including for example an electron microscope, computer software, a perm scope, and the like.

In one specific embodiment of the present disclosure there is applied to cold-steel panels or hot-steel panels supporting substrates, a first single layer of a tetraalkoxysilane containing solution, followed by a second layer coating of a functionalized silane solution, followed by heating, and drying. Subsequently there is applied to the resulting coated panel, a water based paint, a solvent based paint, or a powder coat paint and where after being subjected to a number of environmental testing conditions, inclusive of salt spray testing where for example, the panels are exposed to salt and water at least once, the painted panels are free of corrosion or corrosion resistant for extended time periods of from about 1 to about 7 years, from about 1 to about 5 years, from 1 to about 3 years, or 1 year and where there is minimum or substantially corrosion after these periods of time.

Application of the disclosed silane coating compositions to the supporting substrates or other materials can be accomplished by a spray nozzle, or a number of spray nozzles, a robotic system, a computer controlled process, dip coating, immersion coating, in a bath of separate coating solution containers, hand brushing, blade processes, spin coating methods, and the like with the length of the application being varied from for example. from about 5 seconds to about 60 seconds, from about 1 minute to about 2 minutes, or about 15 seconds, depending on the thickness of the coating desired and the thickness of the layers being applied. Other time lengths not specifically recited herein for the application of the coatings can be selected.

More specifically the disclosed process comprises applying a base silane, like (TEOS), aqueous coating to a metal substrate. Subsequently a second aqueous silane coating comprised of a functionalized silane, is then applied on top of the first silane layer. The two silane coatings serve not only as a physical barrier against water ingress to the substrate metal, but also provide an effective means of adhering any applied paint to the overall metal system. The tetraalkoxysilane and functionalized silane layers may also contain in various effective amounts, such as from about 0.1 to about 10, from about 1 to about 5, from about 1 to about 2 weight percent, metals, and/or their ions, such as molybdenum, copper, manganese, aluminum, sodium, magnesium, calcium, potassium, strontium, and lithium, which metals may assist in the disclosed corrosion resistant or corrosion free characteristics. Also, in embodiments of the present disclosure the functionalized layer is applied to the supporting substrate followed by the application of a second layer thereover of the tetraalkoxysilane, and where in embodiments a plurality or at least one of each of the functionalized silane layer and at least one of the TEOS layer While not being desired to be limited by theory, it is believed that when the base silane coating is applied to and contacts a metal substrate from an aqueous formulation thereof, Si—O-M bonds form (where M represents a metal atom of the substrate). Following the application of this initial silane layer a number of silanol (Si—OH) moieties are available for further reaction. A second silane coating, typically composed of a functionalized silane, is then applied on top of the first silane layer from an aqueous formulation and forms chemical bonds with the first layer via Si—O—Si linkages. The two silane coatings serve not only as a physical barrier against water ingress to the substrate metal, but also provide a means of adhering any applied paint to the overall metal system. Each of The silane layers may also contain metals, and/or their ions, such as molybdenum, copper, manganese, aluminum, sodium, magnesium, calcium, potassium, strontium, and lithium, which behave as sacrificial corrosion inhibitors, that is for example, these metals further protect the substrates from corrosion.

Specific embodiments will now be described in detail. These examples are intended to be illustrative, and not limited to the materials, conditions, or process parameters set forth in these embodiments. All parts are percentages by solid weight unless otherwise indicated.

Aminoethylaminopropyltrimethoxysilane (Silane Z6094) were obtained from Dow Corning Corporation (Midland, Mich., USA). Tetraethoxysilane (TEOS) was obtained from Eastman Chemical Company Rochester, N.Y., USA). Diethylene glycol monobutylether (Dowanol DB). Citric acid was obtained from Vanchem Performance Chemicals (Burlington, Ontario, Canada). Nitric acid was obtained from Anachemia Canada Inc. (Montréal, Québec, Canada). (3-Aminopropyl)triethoxysilane (APTES) was obtained from Sigma-Aldrich (Saint. Louis, Mo., USA). Sodium methylsiliconate in water (30%) was obtained from Gelest (Morrisville, Pa., USA).

EXAMPLE 1

Formulation MF-VPC1-020, a two-step solution, was prepared as follows:

Solution A: Combined distilled water (100 grams) and silane Z6094 (25 grams) in a 1 liter beaker and stirred the resulting mixture for 1.5 hours at room temperature, about 25 degrees Centigrade and where heat was released upon the addition of the silane. The obtained solution was clear and colorless.

Solution B1: Combined TEOS (10 grams) and Dowanol (25 grams) in a 1 liter beaker, followed by stirring for 15 minutes at room temperature (throughout room temperature or r. t. means for example, a temperature of from about 21 to about 25 degrees Centigrade unless specifically indicated otherwise. The obtained solution was clear and colorless.

Solution B2: There was added 75 grams of water to a 1 liter beaker. Subsequently 2.5 grams of citric acid was added to the 1 liter beaker and was dissolved in the water. Nitric acid, 12.5 grams, was subsequently added to the resulting citric acid solution in a drop wise manner and stirred for 10 minutes at room temperature. The obtained solution was clear and colorless.

Solution C: The above prepared solution B1 was added to the above prepared Solution B2 over a 10 minute period while stirring at room temperature, and where heat was released upon addition of Solution B1 to Solution B2. The obtained resulting solution was clear and colorless. Since this solution becomes a gel after about two days it was diluted to 2 percent in water resulting in a solution with no gelation.

EXAMPLE 2

There was prepared a solution by adding 50 grams of distilled water to a 1 liter beaker, followed by the addition to the beaker of 12.5 grams of (3-aminopropyltriethoxysiiane (APTES) followed by stirring for 1 hour at room temperature, about 25 degrees Centigrade. The mixture resulting became cloudy after about 2 minutes of stirring, however the final resulting solution, designed as MF-VPC-1040, was clear and colorless.

EXAMPLE 3

Formulation JS-VPC-1-009 was prepared by placing 18.83 grams of (3-aminopropyl)triethoxysilane (APTES) into a 1 liter beaker. Sodium methylsiliconate 75.09 grams was then added to the 1 liter beaker over a period of 10 minutes at room temperature, about 25 degrees Centigrade followed by stirring for 1 hour. The resulting final solution was clear, colorless, and viscous.

EXAMPLE 4

Formulation MF-VPC1-46 was prepared by placing 24 milliliters of distilled water and 36 milliliters of diethylene glycol monobutylether (Dowanol DB) in a 1 liter beaker. Subsequently 12.84 milliliters (ml) of triacetoxy(vinyl)silane was added to the 1 liter beaker and the mixture resulting was stirred for 1 hour at room temperature, about 25 degrees Centigrade. The resulting final solution was a clear and yellow/bronze in color

EXAMPLE 5

Panel Coatings

Vanclean S75NP, 350 milliliters obtained from Vanchem Performance Chemicals (Burlington, Ontario, Canada) was placed in a 4 liter beaker and there was subsequently added to the beaker 3.5 liters of warm tap water resulting in a diluted 10 percent cleaning solution. The resulting solution was then stirred and heated to 60 degrees Centigrade. Subsequently a number of cold rolled steel and hot rolled steel panels (obtained from ACT Test Panel Technologies, Hillsdale, Mich.) were dipped into the formed surfactant cleaning solution for 5 minutes and then thoroughly rinsed with warm tap water before the following Treatment #1.

For treatment #1, a 2 percent solution of Solution C of Example 1 (MF-VPC1-020) was prepared with 70 milliliters of this solution diluted to 3.5 liters with warm tap water in a 4 liter beaker. Cold-steel and hot-steel panels were then each dipped into this solution for 1 minute at room temperature, followed by thoroughly rinsing with warm tap water; then each panel was subjected to treatment #2.

Treatment #2: Comprised the utilization of at least one of the following solutions prepared above or mixtures thereof:

(i) a 2% solution of Solution A (MF-VPC1-020), (ii) the APTES solution (MF-VPC1-040), (iii) the APTES/siliconate solution (JS-VPC1-009), or; (iv) the vinyl silane solution (MF-VPC1-046). The desired solutions, 70 milliliters each, were diluted with 3.5 liters of warm tap water in a 4 liter beaker and the panels were dipped into these solutions, which could be present is separate containers, for 1 minute at room temperature followed by thoroughly rinsing each panel with warm tap water.

Post-treatment: Subsequently each of the panels were dried with a heat gun and any residual liquid resulting was gently soaked up with paper towels. Thereafter, each of the panels were then placed on a drying rack and allowed to air dry. Each of the resulting panels contained a separate first coating and a separate second coating in contact with the first coating; see Table 1 below; treatments #1 and #2.

TABLE 1

Min means minutes; r.t. means room temperature of from about 21 to about 25 degrees Centigrade; treatments were accomplished with the above prepared solutions; cleaner refers to the surfactant solution recited herein.

| Formulation Number | Panel # | Substrate | Pre-treatment | Treatment #1 | Treatment #2 | Post-treatment |
|---|---|---|---|---|---|---|
| 1 | A0037-A0038 | CRS[a] | Cleaner at 60° C. for 5 min followed by a rinse with tap water | 3-month old Solution C: 1 min at r.t. followed by a rinse with tap water | 3-month-old MF-VPC1-040 (APTES in water): 1 min at r.t. followed by a rinse with tap water | Dry with heat gun, let air dry. |
| 2 | A0039-A0068 | CRS | Cleaner at 60° C. for 5 min followed by a rinse with tap water | Solution C: 1 min at r.t. followed by a rinse with tap water | Fresh MF-VPC1-040 (APTES in water): 1 min at r.t. followed by a rinse with tap water | Dry with heat gun, let air dry. |
| 3 | A0069-A0070 | CRS | Cleaner at 60° C. for 5 min followed by a rinse with tap water | Solution C: 1 min at r.t. followed by rinse with tap water | MF-VPC1-46 (vinyl silane): 1 min at r.t. followed by a rinse with tap water | Dry with heat gun, let air dry. |
| 4 | A0071-A0072 | CRS | Cleaner at 60° C. for 5 min followed by rinse with tap water | Solution C: 1 min at r.t. followed by rinse with tap water | JS-VPC1-009 (siliconate APTES): 1 min at r.t. followed by rinse with tap water | Dry with heat gun, let air dry. |
| 5 | A005-A006 | HRS[b] | Cleaner at 60° C. for 5 min followed by a rinse with tap water | Solution C: 1 min at r.t. followed by a rinse with tap water | MF-VPC1-46 (vinyl silane): 1 min at r.t. followed by rinse with tap water | Dry with heat gun, let air dry. |
| 6 | A007-A008 | HRS | Cleaner at 60° C. for 5 min followed by a rinse with tap water | Solution C: 1 min at r.t. followed by a rinse with tap water | JS-VPC1-009 (siliconate APTES): 1 min at r.t. followed by a rinse with tap water | Dry with heat gun, let air dry. |

[a]cold-rolled steel;
[b]hot-rolled steel

EXAMPLE 6

A number of the silane-based anti-corrosion coating formulations of Table 1 were then tested and where the anti-corrosion formulations were water-based. More specifically 40 panel samples of hot-rolled steel and cold-rolled steel after being coated with the above prepared silane formulations, were painted, and subjected to salt-sprays corrosion testing at Warner Custom Coatings, Incorporation (30 panels) or Rockwell International (10 panels).

The metal test panels coated with two separate silane layers (TEOS and APTES) of the above appropriate Examples, not only resulted in excellent anti-corrosion properties but also ensured optimal paint adhesion to the coated panels. Thus, the first silane layer to contact the metal surface was designed to serve a dual purpose. Therefore, bonding a layer based on TEOS directly to the steel surface of either the hot-rolled steel or cold-rolled steel substrate not only serves to protect the metal surface from water ingress, but also provides an ideal bonding environment for the subsequent functionalized silane layer.

The results of the above testings are provided in Table 2.

TABLE 2

Summary of silane-coated hot-rolled steel and cold-rolled steel performance in anti-corrosion and corrosion free tests.

| Formulation Number | Panel # | Substrate | Company | Average Time Before Corrosion (hours)[c,d] | Max Corrosion Creepage at Fail (mm) | Mean Corrosion Creepage Rating | Blister Evaluation (ASTM D714-87) Rating |
|---|---|---|---|---|---|---|---|
| 1 | A0037-A0038 | CRS[a] | Rockwell | 721 ± 307 | N/A | N/A | N/A |
| 2 | A0039-A0068 | CRS | Warner | 1163 ± 424 | 4.6 ± 1.7 | 5 ± 1 | 10 |
| 3 | A0069-A0070 | CRS | Rockwell | 1023 ± 120 | N/A | N/A | N/A |
| 4 | A0071-A0072 | CRS | Rockwell | 1107 ± 0 | N/A | N/A | N/A |
| 5 | A005-A006 | HRS[b] | Rockwell | 504 ± 0 | N/A | N/A | N/A |
| 6 | A007-A008 | HRS | Rockwell | 504 ± 0 | N/A | N/A | N/A |

[a]cold-rolled steel
[b]hot-rolled steel
[c]the time at which testing was suspended
[d]Anti-corrosion tests at Warner Custom Coating Inc. were performed according to ASTM D1654-92

Once coated with the above first protective tetraalkoxy silane layer and then the functionalized silane layers the metal substrates were painted with either Rockwell 49 Grey or CAT Black (Warner). The panels were then scribed with a carbide tip (Warner and Rockwell carbide bit for scribing panels) and placed in a salt-spray chamber. The panels submitted to Warner Custom Coating Inc. and Rockwell Automation were evaluated in accordance with ASTM B117 standards, followed by testing in accordance with ASTM D714-02 (blistering), and ASTM D1654-05 (creepage, undercutting or delamination) protocols or methodologies.

While not being desired to be limited by theory it is hypothesized that in addition to inhibiting water ingress to the metal substrate that the alkene functionality present in the ultimate silane layer in Formulations 3 and 4 provided a site with which the power coat paint can react.

Formulation 2 was only applied to cold-rolled steel substrates, and where this formulation provided, on average, 1,163±424 hours of corrosion protection for the metal substrate within the salt-spray chamber (Table 2). Of the panels tested using Formulation 2, 63.3% of the test panels demonstrated no corrosion after 960 hours with the most effective panel providing 1,800 hours of corrosion protection.

With this formulation the initial TEOS layer provides not only a physical barrier inhibiting contact between the metal substrate and water, but it also serves to provide a surface which permits the formation of thermodynamically favorable (531 kJ/mol [1277 kcal/mol]) Si—O—Si bonds between the TEOS layer and the (aminopropyl)triethoxysilane (APTES) layer. Given the anionic nature of powder-coat paints, a strong electrostatic interaction is postulated to occur between the paint and the cationic ammonium groups of the APTES layer; this electrostatic interaction facilitates the paint adhesion to the substrate and retards paint delamination.

The Table 1 and Table 2 metal test panels with an absence of the disclosed above TEOS and APTES treatments resulted in paint coatings that were corrosion resistant for a period of only about 100 experimental hours.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A process comprising the application of at least one tetraalkoxysilane layer and at least one functionalized silane layer to a supporting substrate, wherein said at least one functionalized silane layer is an aminoalkylalkoxysilane layer or an aminoalkylaminoalkylalkoxysilane layer.

2. A process in accordance with claim 1 wherein the at least one tetraalkoxysilane layer and the at least one functionalized silane layer are a plurality of layers, each of from 1 to about 10 layers.

3. A process in accordance with claim 2 wherein the plurality of layers are each from 1 to about 5 layers.

4. A process in accordance with claim 2 wherein the plurality of layers are each one layer and wherein said tetraalkoxysilane is applied as a first layer prior to the application of said functionalized silane second layer resulting in said supporting substrate, said tetraalkoxysilane first layer in contact therewith, and said functionalized second layer in contact with said first layer.

5. A process in accordance with claim 2 wherein the plurality of layers are each one layer and wherein said functionalized silane is applied as a first layer prior to the application of said tetraalkoxysilane as a second layer resulting in said supporting substrate, said functionalized silane first layer in contact therewith, and said tetraalkoxysilane second layer in contact with said first layer, or wherein said tetraalkoxysilane is applied as a first layer and said functionalized silane is applied as a second layer in contact with said first layer.

6. A process in accordance with claim 1 wherein said tetraalkoxysilane is a tetramethoxysilane, a tetraethoxysilane, a tetrapropoxysilane, a tetrabutoxysilane, a tetrapentoxysilane, a tetrahexaoxysilane, a tetraheptoxysilane, or a tetraoctoxysilane, and said supporting substrate is a metal.

7. A process in accordance with claim 1 wherein said tetraalkoxysilane layer is tetraethoxysilane, and wherein said at least one tetraalkoxysilane layer and said at least one functionalized silane layer are from 1 to about 5 layers.

8. A process in accordance with claim 1 wherein said tetraalkoxysilane is tetraethoxysilane, and said tetraethoxysilane is applied to said substrate as a first layer and said functionalized silane is applied as a second layer in contact with said first layer and wherein said substrate is steel.

9. A process in accordance with claim 1 wherein said at least one tetraalkoxysilane layer and said at least one functionalized silane layer are applied as coatings from separate solutions thereof and wherein said at least one for said tetraalkoxysilane is from 1 to 3 layers and said at least one for said functionalized silane is from 1 to 4 layers and wherein said tetraalkoxysilane layer is applied prior to the application of said functionalized silane layer resulting in sequence of said supporting substrate, said at least one tetraalkoxysilane layer in contact therewith, and said at least one functionalized silane layer in contact with said tetraalkoxysilane layer.

10. A process in accordance with claim 9 wherein said at least one tetraalkoxysilane layer and said at least one functionalized silane layer are applied as coatings from separate solutions that contain said silanes, and a mixture of acids, a glycol, and as an optional component water.

11. A process in accordance with claim 10 wherein the acids are nitric acid, and citric acid; said glycol is diethylene glycol monobutyl ether and said water is distilled water and wherein at least one tetraalkoxysilane layer is one layer and said at least one functionalized silane layer is one layer.

12. A process in accordance with claim 11 wherein said at least one tetraalkoxysilane layer and said at least one functionalized silane layer are applied as coatings from separate solutions thereof containing a dialkylene glycol alkylether and water.

13. A process in accordance with claim 10 wherein said dialkylene glycol alkylether is a diethylene glycol monobutylether.

14. A process in accordance with claim 10 wherein said resulting product of at least one tetraalkoxysilane layer, at least one functionalized silane layer and said supporting substrate are free of corrosion for extended time periods of from about 1 year to about 7 years.

15. A process in accordance with claim 14 wherein said at least one layer is two layers, a first layer of the tetraalkoxysilane and a second layer thereover of the functionalized silane and said supporting substrate is metal or a metal containing substance.

16. A process in accordance with claim 1 wherein alkyl and alkoxy of said tetraalkoxysilane and said functionalized silane of an aminoalkylaminoalkylalkoxysilane, and an aminoalkylalkoxysilane contain from 1 to about 25 carbon atoms.

17. A process in accordance with claim 1 wherein alkyl and alkoxy of said tetraalkoxysilane and said functionalized silane of an aminoalkylaminoalkylalkoxysilane, and an aminoalkylalkoxysilane contain from 1 to about 10 carbon atoms.

18. A process in accordance with claim 17 wherein said alkyl is methyl, ethyl, propyl, butyl, pentyl, or heptyl, and said alkoxy is methoxy, ethoxy, propoxy, butoxy, pentoxy, or heptoxy.

19. A process in accordance with claim 1 wherein alkyl and alkoxy of said tetraalkoxysilane and said functionalized silane of, an aminoalkylaminoalkylalkoxysilane and an aminoalkylalkoxysilane contain from 1 to about 6 carbon atoms.

20. A process comprising applying to a supporting substrate layer of a metal or a metal containing substance, a first layer solution of a tetraalkoxysilane and a second layer solution thereover of aminoethylaminopropylmethoxysilane, each of said first and second layer possessing a thickness of from about 0.05 microns to about 25 microns, resulting in corrosion free characteristics for said supporting substrate layer subsequent to drying.

21. A process in accordance with claim 20 wherein said supporting substrate is a metal or a metal containing substance, said tetraalkoxysilane is a tetraethoxysilane, and optionally wherein each silane layer possesses a thickness of from about 0.1 microns to about 10 microns.

22. A process which comprises applying to surfaces an aqueous solution of at least one tetraalkoxysilane in at least one first layer and a solution of at least one aminoalkylalkoxysilane and/or at least one aminoalkylaminoalkylalkoxysilane in at least one second layer, and wherein said resulting surfaces are corrosion free for extended time periods of from about 1 year to about 7 years.

23. A process in accordance with claim 22 wherein said tetraalkoxysilane is a tetraethoxysilane, and said surfaces are comprised of cold-roll steel or hot-rolled steel and said at least one is from 1 to about 2 layers for each first layer and for each second layer.

24. A process in accordance with claim 22 wherein said surfaces are painted with water based paints, solvent based paints, or powder-coat paints, and wherein said surfaces comprise cold-roll steel or hot-rolled steel and are substantially free of corrosion for extended time periods of from about 2 years to about 7 years.

25. A corrosion resistant supporting substrate comprising a layer comprised of a tetraalkoxysilane and a layer comprised of a functionalized silane selected from the group consisting of an aminoalkylaminoalkylalkoxysilane and an aminoalkylalkoxysilane.

26. A corrosion resistant supporting substrate in accordance with claim 25 wherein said alkyl contains from 1 to about 6 carbon atoms, and said alkoxy contains from 1 to about S carbon atoms.

27. A corrosion resistant supporting substrate in accordance with claim 25 wherein said tetraalkoxysilane is tetraethoxysilane.

28. A corrosion resistant supporting substrate in accordance with claim 25 further containing a component that forms a solution thereof and wherein alkyl and alkoxy of said tetraalkoxysilane and said functionalized silane of an aminoalkylaminoalkylalkoxysilane, and an aminoalkylalkoxysilane contain from 1 to about 10 carbon atoms.

29. A process comprising applying to a supporting substrate layer comprising a metal or a metal containing substance, a first layer solution of a tetraalkoxysilane and a second layer solution thereover of aminoethylaminopropylmethoxysilane, resulting in corrosion free characteristics for said supporting substrate layer subsequent to drying.

* * * * *